May 13, 1969 W. M. POSINGIES 3,443,574

FLUID APPARATUS

Filed April 4, 1966

INVENTOR.
WALTER M. POSINGIES
BY Ronald T. Reiling
ATTORNEY

United States Patent Office 3,443,574
Patented May 13, 1969

3,443,574
FLUID APPARATUS

Walter M. Posingies, Minneapolis, Minn., assignor to Honeywell Inc., Minneapolis, Minn., a corporation of Delaware Filed Apr. 4, 1966, Ser. No. 539,809
Int. Cl. F15c *1/12;* G06m *1/12*
U.S. Cl. 137—81.5 9 Claims

ABSTRACT OF THE DISCLOSURE

A pure fluid feedback modulator which produces a pressure pulse train output signal in which both the pulse duration and repetition rate vary in response to an analog input signal. The modulator comprises a first bistable amplifier cascaded with a second bistable or proportional amplifier and negative feedback paths connecting the output of the first amplifier to the input of the second amplifier.

Figure 1:
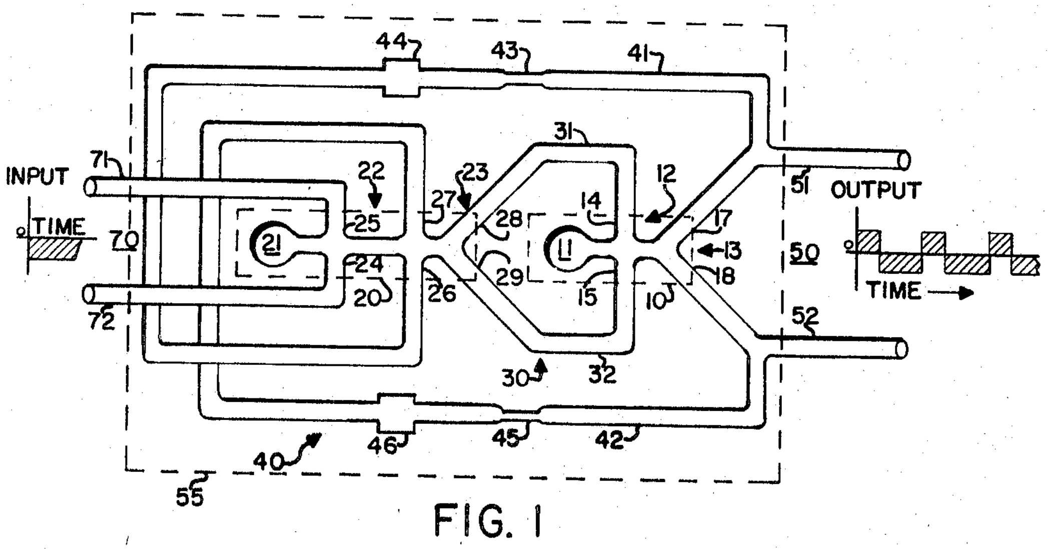

This invention is related to pure fluid modulators and more particularly to pure fluid feedback modulators.

The present day requirements of higher reliability and lower cost have resulted in development of a new area of technology referred to as pure fluid apparatus and systems. A pure fluid control system is a system wherein the sensing, amplification, compensation and actuation are accomplished by means of pure fluid apparatus. A pure fluid apparatus is a device which has no moving parts other than the fluid medium. When referring to a pure fluid system or apparatus in the specification, it will be under stood that the system or apparatus has no moving parts other than the fluid medium.

Many of the various pure fluid control systems utilize digital or pulse duration modulation. The utilization of prior art pure fluid modulators in these control systems has resulted in problems at high percentage modulation. More specifically, the prior art modulators provide an extremely short duration pulse at the high percent modulation and the fluid apparatus in the fluid control system will not follow this extremely short duration pulse. Accordingly, proper operation of the system is not achieved.

The applicant's unique pure fluid feedback modulator solves this problem by limiting the duration of the pulse to a finite duration which all of the fluid apparatus of the control system will follow. This is accomplished by modulating both the pulse duration and the frequency with the applicant's feedback modulator. The applicant utilizes a pair of cascaded fluid amplifiers in conjunction with negative feedback circuit means in his feedback modulator.

Figure 2:
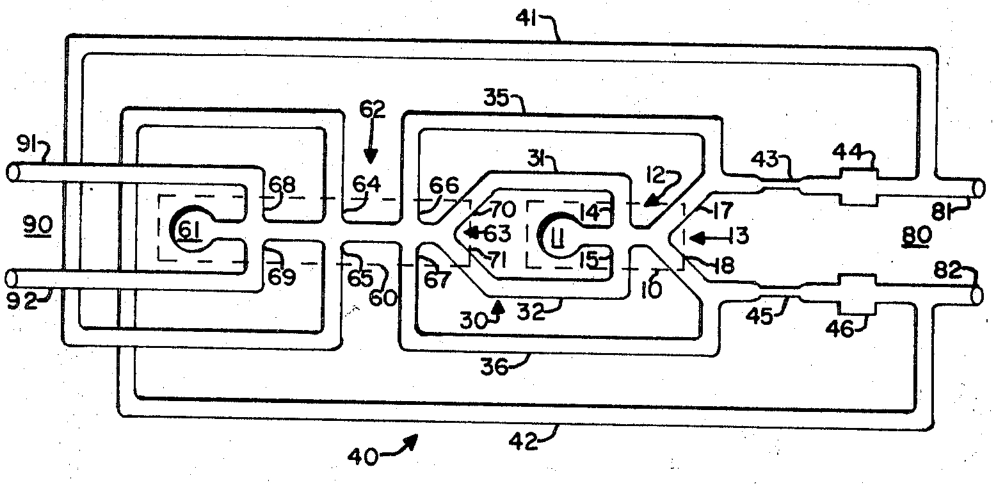

A complete understanding of the invention will become apparent from a study of the accompanying specification and claims in conjunction with the drawing in which:

FIGURE 1 is a schematic representation of the applicant's feedback modulator; and FIGURE 2 is a schematic representation of an alternate embodiment of the applicant's feedback modulator.

Referring now to FIGURE 1, reference numeral 10 generally depicts a bistable pure fluid amplifier means. Bistable amplifier means 10 includes a fluid supply passage 11, control passage means 12 and outlet passage means 13. In this particular embodiment, control passage means 12 includes a pair of control passages 14 and 15 therein. Outlet passage means 13 in this particular embodiment includes a pair of outlet passages 17 and 18. It should be understood, that the applicant does not wish to be limited to this particular bistable amplifier means. Any apparatus functioning as a bistable fluid amplifier means may be utilized.

Reference numeral 20 depicts a bistable pure fluid amplifier means. It should be pointed out, that amplifier means 20 may also be a proportional fluid amplifier. Bistable amplifier means 20 includes a fluid supply conduit 21, control conduit means 22 and outlet conduit means 23. In this particular embodiment, control conduit means 22 includes a first pair of control conduits 24 and 25 and a second pair of control conduits 26 and 27. Bistable amplifier means 20 may utilize additional control conduits depending upon the particular embodiment. Outlet conduit means 23 includes a pair of outlet conduits 28, 29 in this embodiment.

Means 30 are provided for connecting outlet conduit means 23 of bistable amplifier means 20 to control passage means 12 of bistable amplifier means 10. Means 30 comprises a duct 31 connecting outlet conduit 28 to control passage 14 and a duct 32 connecting outlet conduit 29 to control passage 15. Thus, bistable amplifier 20 is cascaded with bistable amplifier 10. Of course, additional amplifiers may be included in the cascade.

Reference numeral 40 depicts feedback circuit means connecting outlet passage means 13 of bistable amplifier means 10 to bistable amplifier means 20. In the particular embodiment illustrated in FIGURE 1, feedback circuit means 40 includes a first negative feedback loop 41 and a second negative feedback loop 42. Negative feedback loop 41 connects outlet passage 17 of bistable amplifier means 10 to control conduit 26 of bistable amplifier means 20. Negative feedback loop 42 connects outlet passage 18 of bistable amplifier means 10 to control conduit 27 of bistable amplifier means 20. Feedback loop 41 includes a fluid resistance 43 and a fluid capacitance 44 therein. Feedback loop 42 includes fluid resistance 45 and fluid capacitance 46 therein.

Output signal means 50, energized from bistable amplifier means 10, are provided. In this particular embodiment, output signal means 50 comprises an output passage 51 connected to outlet passage 17 and an output passage 52 connected to outlet passage 18. Output passages 51 and 52 are connected to a load which is represented by the resistances illustrated in the passages. Other output signal means may be utilized in the applicant's invention.

Input signal means 70 are provided. In this particular embodiment, input signal means 70 comprises an input duct 71 connected to control conduit 25 and an input duct 72 connected to control conduit 24. Other input signal means may be utilized.

In operation, supply passages 11 and 21 are connected to a 10 p.s.i. fluid supply. With no input signal in input signal means 70, all of the fluid flowing from supply conduit 21 will flow through one of the outlet conduits, for example, outlet conduit 28. The fluid flowing in outlet conduit 28 is directed to control passage 14 of amplifier means 10 by duct 31. The fluid flow in control passage 14 is effective to divert the flow of fluid from supply passage 11 into outlet passage 18. A portion of the fluid flow in outlet passage 18 provides an output signal in outlet duct 52. The magnitude of the output signal of the applicant's modulator is plus or minus 5 p.s.i., that is, the pressure differential between outlet duct 51 and 52 is plus or minus 5 p.s.i. A portion of the fluid flow in outlet passage 18 flows through negative feedback loop 42 to control conduit 27 of amplifier means 20. Fluid resistance 45 and fluid capacitance 46 are proportioned so as to provide a nominal pressure of 2 p.s.i. in control conduit 27. Control conduit 26 is also with a nominal pressure of 2 p.s.i. The pressure in control conduits 26 and 27 varies from 1.8 p.s.i. to 2.2 p.s.i., that is, 2 p.s.i. plus or minus .2 p.s.i. Consequently, there is a maximum pressure differential between control conduits 26 and 27 of .4 p.s.i. With fluid flow in outlet passage 18, control conduit 27 will have a pressure exceeding that of control conduit 26 by a maximum of .4 p.s.i. This causes the fluid flowing from supply conduit 21 to be diverted through outlet conduit 29 and into control passage 15 of amplified means 10. This results in fluid flow through outlet passage 17 and a negative feedback signal through feedback loop 41. The feedback signal is effective to switch a fluid stream flowing from supply conduit 21 to flow through outlet conduit 28. Consequently, with no input signal, the applicant's feedback modulator 55 provides a square wave oscillating output having a fixed pulse duration and a fixed frequency.

When an input signal is supplied to the modulator, for example, a 2 p.s.i. signal in conduit 72 modulation of the pulse duration and the frequency is obtained. A typical input signal is schematically illustrated in FIGURE 1. The input signal in duct 72 diverts the flow of fluid from supply conduit 21 to flow through outlet conduit 28 and into control passage 14. This results in fluid flow in outlet passage 18 and a feedback signal through negative feedback loop 42 to control conduit 27. When the pressure differential between control conduits 26, 27 exceeds the pressure differential of control conduits 24, 25 by an amount equal to the switching threshold of amplifier means 20, the fluid is switched from outlet conduit 28 to outlet conduit 29. The fluid flow remains in outlet conduit 29 until the input signal across conduits 24, 25 exceeds the pressure differential across control conduits 26, 27 by an amount equal to the switching threshold level of amplifier means 20. With the pressure in control conduit 24 exceeding that in control conduit 25 because of the input signal, the fluid flow must remain in outlet passage 18 a longer period of time than in outlet passage 17 so as to overcome the effect of the input signal. A typical output signal is illustrated in FIGURE 1.

With the applicant's design, the duration of the minimum pulse is fixed at a predetermined value so that all fluid apparatus in the control system will respond to it. The applicant obtains a high percentage of modulation by extending the off time, that is, changing the frequency. More specifically, the percentage of modulation is defined as the difference between the time on and the time off divided by the sum of the time on and the time off:

$$\text{Percent mod.} = \frac{t_{\text{on}} - t_{\text{off}}}{t_{\text{on}} + t_{\text{off}}}$$

When the time off equals the time on, the percent modulation is zero, which would be the condition when no input signal is supplied to the feedback modulator. Looking at the plot of the output signal in FIGURE 1, the time on is represented by the pulse above the line and the time off is represented by the pulse below the line. It is clear that a high percent modulation can be obtained by extending the off time and holding the time on to a predetermined minimum.

Referring now to FIGURE 2, another embodiment of the applicant's feedback modulator is illustrated. In FIGURE 2, elements identical to those illustrated in FIGURE 1 are identified with the same reference numerals. Bistable fluid amplifier means 10, means 30 and feedback circuit means 40 are similar to that illustrated in FIGURE 1 and need not be described in detail. This embodiment, bistable amplifier means 20, is replaced with proportional fluid amplifier means 60.

Proportional amplifier means 60 includes a fluid supply conduit 61, control conduit means 62, and outlet conduit means 63. In this particular embodiment, control conduit means 62 includes a first pair of control conduits 64, 65, a second pair of control conduits 66, 67, and a third pair of control conduits 68, 69. Outlet conduit means 63 includes a pair of outlet conduits 70 and 71.

Means 30 are provided for connecting outlet conduit means 63 of proportional amplifier means 60 to control passage means 12 of bistable amplifier means 10. Means 30 comprises a duct 31 connecting outlet conduit 70 to control passage 14 and a duct 32 connecting outlet conduit 71 to control passage 15.

A positive feedback passage 35 is provided between outlet passage 17 of bistable amplifier means 10 and control conduit 66 of proportional amplifier means 60. A positive feedback passage 36 is provided between outlet passage 18 of bistable amplifier means 10 to control conduit 67 of proportional amplifier means 60.

Bistable amplifier means 10, feedback passages 35 and 36, and control conduits 66 and 67 of proportional amplifier means 60 collectively define a bistable fluid apparatus that functions the same as bistable fluid amplifier means 10. This bistable fluid apparatus is the subject matter of copending application Ser. No. 528,927, assigned to the same assignee as the present application.

Reference numeral 40 depicts feedback circuit means connecting outlet passage means 13 of bistable amplifier means 10 to proportional amplifier means 60. In the particular embodiment illustrated, feedback circuit means 40 includes a first negative feedback loop 41 and a second negative feedback loop 42. Negative feedback loop 41 connects outlet passage 17 of bistable amplifier means 10 to control conduit 65 of proportional amplifier means 60. Negative feedback loop 41 includes a fluid resistance 43 and a fluid capacitance 44 therein. Negative feedback loop 42 connects outlet passage 18 of bistable amplifier means 10 to control conduit 64 of proportional amplifier means 60. Negative feedback loop 42 includes a fluid resistance 45 and fluid capacitance 46 therein.

Output signal means 80, energized from bistable amplifier means 10, are provided. In this embodiment, output signal means 80 comprises an output passage 81 connected to feedback loop 41 downstream from fluid resistance 43 and fluid capacitance 44. Output means 80 also includes and output passage 82 connected to negative feedback loop 42 downstream from fluid resistance 45 and capacitance 46. Thus, output means 80 is effectively connected to the outlet passages of bistable amplifier means 10 through the fluid resistance and fluid capacitance.

Input signal means 90 is provided. In this embodiment, input signal means 90 comprises an input duct 91 connected to control conduit 68 and an input duct 92 connected to control conduit 69.

The operation of the embodiment illustrated in FIGURE 2 is similar to the operation of the embodiment illustrated in FIGURE 1. With no input signals provided in input signal means 90, the feedback modulator provides an output signal having zero percent modulation, that is, equal duration on and off pulses at a fixed frequency. Hence, output signal means 80 is connected downstream from the fluid resistance and fluid capacitance a triangle wave output is obtained. When an input signal is supplied to input signal means 90, the modulation of the pulse duration and frequency is obtained as explained in detail with reference to FIGURE 1 and need not be described in detail.

I claim as my invention:

1. A pure fluid feedback modulator comprising:

bistable fluid amplifier means including a fluid supply passage for issuing a fluid stream and a pair of outlet passages for receiving the fluid stream, said bistable fluid amplifier means further including control passage means positioned intermediate said fluid supply passage and said pair of outlet passages for providing fluid signals operable to switch the fluid stream in said pair of outlet passages;

proportional fluid amplifier means including a fluid supply conduit for issuing a fluid stream and outlet conduit means for receiving the fluid stream, said proportional fluid amplifier means further including a first and a second pair of control conduits positioned intermediate said fluid supply conduit and said outlet conduit means for providing fluid signals operable to control the fluid stream in said outlet conduit means, said proportional fluid amplifier means being cascaded with said bistable fluid amplifier means;

feedback circuit means including a first and a second negative feedback loop, said first negative feedback loop connecting an outlet passage of said pair of outlet passages to a control conduit of said second pair of control conduits, said second feedback loop connecting the other outlet passage of said pair of outlet passages to the other control conduit of said second pair of control conduits;

input signal means connected to said first pair of control conduits of said proportional fluid amplifier means; and output signal means energized from said pair of outlet passages of said bistable fluid amplifier means.

2. The pure fluid feedback modulator of claim 1 in which said proportional fluid amplifier means further includes a third pair of control conduits and said feedback circuit means further includes a first and a second positive feedback loop, said first positive feedback loop connecting an outlet passage of said pair of outlet passages of said bistable fluid amplifier means to a control conduit of said third pair of control conduits of said proportional fluid amplifier means, said second positive feedback loop connecting the other outlet passage of said pair of outlet passages to the other control conduit of said third pair of control circuits.

3. The pure fluid feedback modulator of claim 1 wherein said first and said second negative feedback loops include a fluid resistance and a fluid capacitance therein connected in a series relationship.

4. A pure fluid feedback modulator comprising:

bistable fluid amplifier means having a fluid supply passage, a pair of control passages, and a pair of outlet passages;

second fluid amplifier means having a fluid supply conduit, a first and a second pair of control conduits, and a pair of outlet conduits;

means connecting one of said pair of outlet conduits of said second fluid amplifier to one of said pair of control passages of said bistable fluid amplifier and connecting the other of said pair of outlet conduits to the other of said pair of control passages;

feedback circuit means including a first and a second negative feedback loop, said first negative feedback loop connecting one of said pair of outlet passages of said bistable fluid amplifier to one of said of first pair of control conduits of said second amplifier, said second negative feedback loop connecting the other of said pair of outlet passages to the other of said first pair of control conduits;

input signal means connected to said second pair of control conduits; and output signal means energized from said pair of outlet passages of said bistable fluid amplifier means.

5. The pure fluid feedback modulator of claim 4 in which said second fluid amplifier means is a bistable fluid amplifier.

6. The pure fluid feedback modulator of claim 4 wherein the second fluid amplifier means is a proportional amplifier.

7. The pure fluid feedback modulator of claim 3 wherein said first and said second negative feedback loops include a fluid resistance and a fluid capacitance therein connected in a series relationship.

8. The pure fluid feedback modulator of claim 7 wherein said output signal means is connected to said pair of outlet passages of said bistable fluid amplifier upstream from the fluid resistance and fluid capacitance in said first and said second negative feedback loops.

9. The pure fluid feedback modulator of claim 7 wherein said output signal means is connected to said first and said second negative feedback loops downstream from the fluid resistance and fluid capacitance therein.

References Cited

UNITED STATES PATENTS

| | | | |
|---|---|---|---|
| 3,155,825 | 11/1964 | Boothe | 137—81.5 |
| 3,185,166 | 5/1965 | Horton et al. | 137—81.5 |
| 3,223,101 | 12/1965 | Bowles | 137—81.5 |
| 3,228,410 | 1/1966 | Warren et al. | 137—81.5 |
| 3,250,469 | 5/1966 | Colston | 137—81.5 |

M. CARY NELSON, *Primary Examiner.*

W. R. CLINE, *Assistant Examiner.*

U.S. Cl. X.R.

235—201